May 14, 1968 R. J. LAYBOURN 3,383,104

RECORD CARD FEEDING MECHANISM

Filed Oct. 23, 1965 2 Sheets-Sheet 1

INVENTOR.
ROBERT J. LAYBOURN

BY Otto Schmid, Jr.
ATTORNEY

United States Patent Office 3,383,104

Patented May 14, 1968

3,383,104

RECORD CARD FEEDING MECHANISM

Robert J. Laybourn, San Jose, Calif., assignor to International Business Machines Corporation, Armonk, N.Y., a corporation of New York Filed Oct. 23, 1965, Ser. No. 504,041
11 Claims. (Cl. 271—9)

ABSTRACT OF THE DISCLOSURE

There is provided a record card handling mechanism comprising two sets of feedrolls wherein each set of feedrolls comprises two counter-rotating feedrolls and wherein the two sets of feedrolls are mounted substantially one record card width apart to form a holding and cornering station therebetween. Record cards may be fed into the station through either of the sets of feedrolls and selective means are provided to move the record card at an angle to the entry direction so that the card can be moved to a utilization station without further alignment.

This invention relates to a record card feeding device and more particularly to a device for feeding records into a station from either two directions and ejecting the record cards from the station in a third direction.

Record card processing machines which process data in a column by column manner frequently feed the card from a hopper in a row by row direction and then feed the card on a column by column basis by means of suitable cornering mechanism. As the speed of operation of card processing machines has increased, it has become more difficult to perform a cornering operation on a card and still position the card with sufficient accuracy to move the card through a processing station without further alignment. This alignment takes additional time and mechanism which it would be desirable to eliminate. It is therefore an object of this invention to provide a mechanism whereby a card can be fed from a hopper in a row by row direction and then moved through a processing station in a column by column direction without the necessity for further alignment of the card.

It is another object of this invention to provide a record card holding station for receiving cards fed from either of two directions and to provide means for ejecting the cards from the holding station in a third direction or a fourth direction.

It is a further object of this invention to provide two card feeding means spaced the width of a record card so that the feeding means can be used to feed record cards into the station from either direction and also functions as a holding station where cards may be kept aligned until the cards are advanced in a direction at right angles to the input direction to the station.

Briefly, according to the invention, there is provided a record card handling mechanism comprising first and second card feeding means spaced the width of a record card and driven so that cards can be fed to the station between the feeding means from either feeding means and the record card can then be selectively ejected from the station at substantially right angles to the card feeding means.

The foregoing and other objects, features and advantages of the invention will be apparent from the following more particular description of a preferred embodiment of the invention as illustrated in the accompanying drawings.

Figure 1:
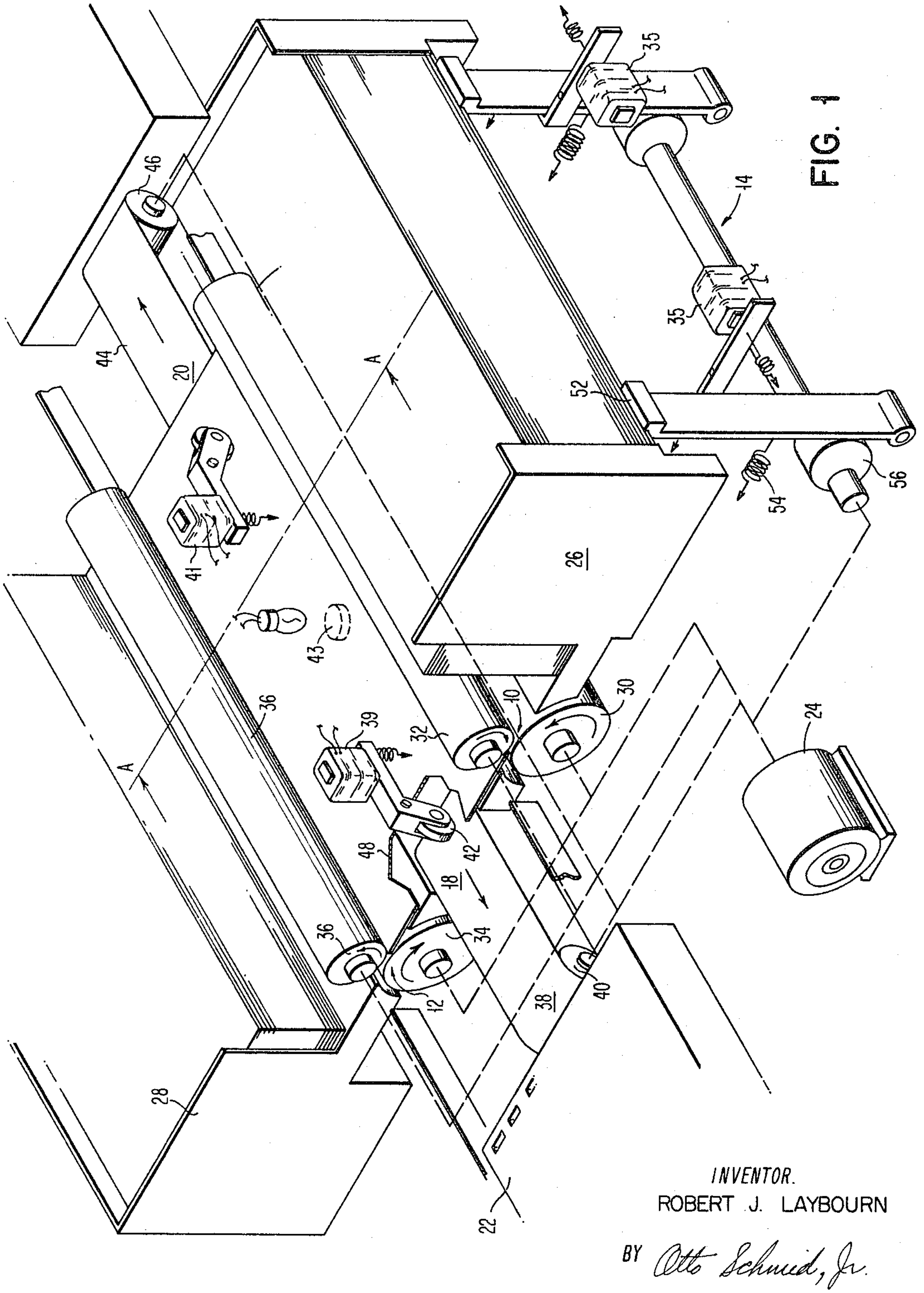
FIGURE 1 is a diagrammatic perspective view of record card feeding mechanism embodying the invention.

Record card feeding mechanism is shown wherein a combined holding and cornering station is formed by a first feeding means 10 and a second feeding means 12 which are spaced essentially one card width apart. Record card hopper means 26, 28 are provided for feeding cards to each of the card feeding means. Cards are fed from the hopper means by feeding means 14, 16, through the corresponding card feeding means 10, 12 to the holding station. Since card feeding means 10, 12 are mounted parallel, the cards are kept aligned in the holding station and a first ejecting means 18 and a second ejecting means 20 are provided to selectively feed the card from the holding station to a utilization device. One such utilization device may be a processing station 22 such as a read station, punch station or print station.

Referring to the embodiment of the invention shown in the drawings, the card feeding means is driven continuously by motor 24 through suitable drive means such as belts (not shown) designated by a dashed line extending from motor 24. Control is provided by selective operation of electromagnets in accordance with the card handling operation to be performed. The first feeding means 10 comprises a feedroll 30 and a cooperating feedroll 32. Feedroll 30 is driven in a counterclockwise direction so that cards moved into the bite of rolls 30, 32 from the right hopper will be fed through the feedrolls into the holding station. The second feeding means comprises feedroll 34 and associated feedroll 36. The feeding means and the other components are mounted in suitable support members which are omitted from the drawing to permit a clearer showing of the parts of the card feeding mechanism. Feedroll 34 is driven in a clockwise direction so that cards moved into the second feeding means from the left hopper will be driven into the holding station. Feedrolls 32 and 36 may also be driven in the direction indicated by the arrow, if desired. When cards are fed from the right hopper into the holding station, the feedrolls 34, 36 comprising the second feeding means serve as a stop means and although the card is moved into the holding station at high velocity, the feedrolls on the opposite side of the holding station prevent the card from going beyond the station since the rolls are turning in a direction to feed the card into the holding station.

Figures 2, 3, 4:
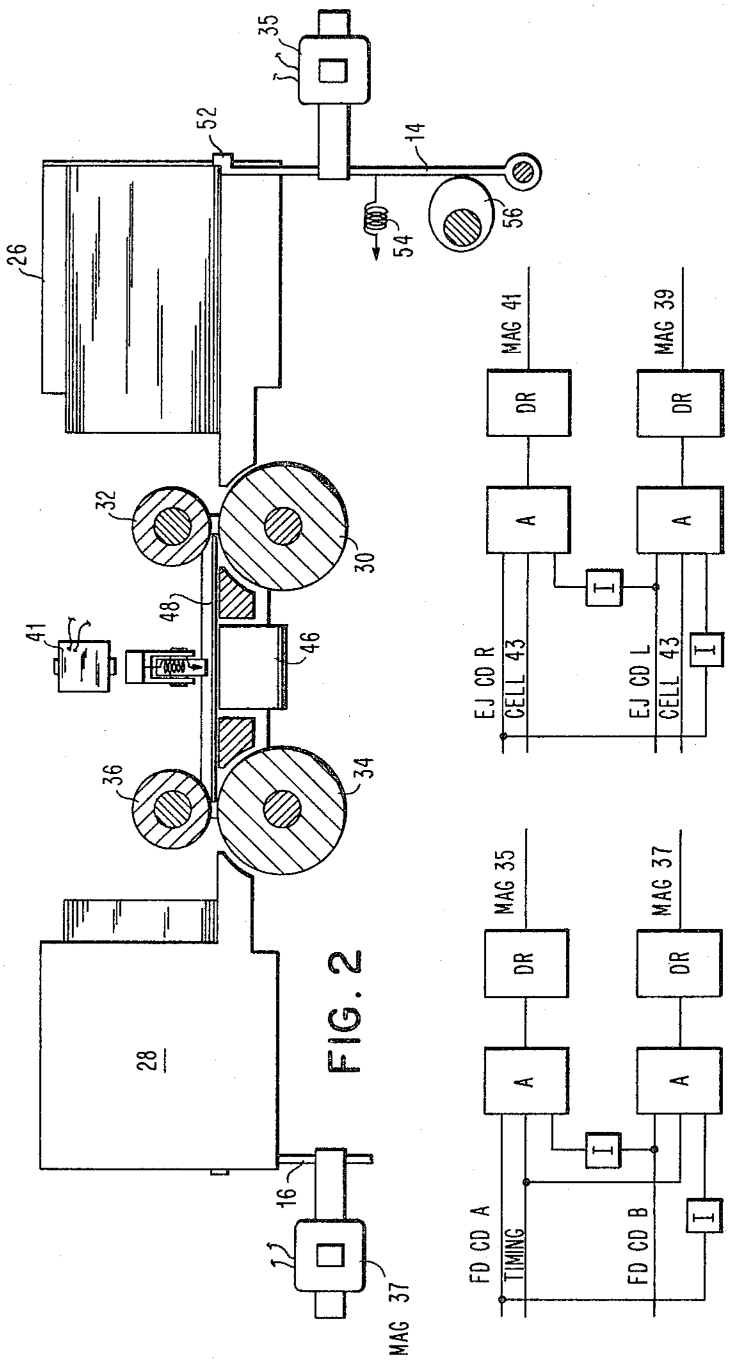
FIGURE 2 is a section view along the lines A—A of FIGURE 1.
FIGURE 3 is a schematic block diagram of the card feed control circuit.
FIGURE 4 is a schematic block diagram of the card eject control circuit.

The first feeding means 14 comprises a pivotally mounted picker knife 52 biased by spring means 54 to a position following continuously rotating cam 56. A control electromagnet 35 is provided, the energization of which causes a mechanical latch of picker knife 52 to be disengaged to release the picker knife to a cam following position and thereby feed a card into feedrolls 30, 32. The energization of magnet 35 is timed to occur when cam 56 is at its high dwell point, as shown in FIGURE 2. A similar mechanism is provided for second feeding means 16 and control electromagnet 37 provides selective control for the feeding of cards from hopper means 28.

When a card has reached the holding station from either the right or left hopper, the card may be ejected from the holding station in either direction parallel to the axis of the feedrolls. First ejecting means 18 functions to move the card to the left as viewed in FIGURE 1, whereas the second ejection means 20 functions to move the card to the right as shown in FIGURE 1. In the embodiment shown first ejecting means 18 comprises a transport belt 38 constantly driven by feedroll 40. Cards are selected for operation by the ejecting means by a pivotally mounted pressure roll which is actuated by electromagnet 39 when it is desired to eject the card. The second ejecting means 20 likewise comprises a feed belt 44 constantly driven by feedroll 46 and adapted to be selectively actuated by pivotally mounted pressure roll 50. Selective control is provided by electromagnet 41.

Referring to FIGURE 2, it can be seen that the spacing of the first feeding means and the second feeding means is approximately the width of a record card. In actual practice, the spacing may vary a few thousandths of an inch from the width of a record card. When feedrolls 32 and 36 are used as pressure rolls, feedrolls 32 and 36 touch driven feedrolls 30, 34. In this case, a suitable material for feedrolls 30, 34 is highly polished steel and a suitable material for the pressure rolls 32, 36 is a somewhat resilient material such as a polyurethane rubber having a 90 durometer hardness. When feedrolls 30, 34 and 32, 36 are driven, the rolls are spaced apart a distance less than the thickness of a record card. For example, the thickness of a standard record card is .007 inch and the feedrolls are normally spaced a distance of .044–.005 inch. In this case, both feedrolls in a set may be made from any suitable material such as polyurethane rubber, as described above, polished steel, or other suitable material. Thus, the exact spacing will depend upon the mode of operation and the material used for the feedrolls. Minor adjustments may also be made, if desired, to minimize the noise due to feeding the cards, to adjust the pressure roll to optimize the feeding action and also to prevent damaging the edge of the card due to a burnishing effect when the card is held in the station for an appreciable time. Thus, in this application when the spacing is stated as one card width, it is recognized that the actual distance may vary slightly due to the type of feedrolls used and those skilled in the art will make these minor changes in accordance with the factors stated above.

Control of the record card feeding mechanism is provided by selectively actuated control means. Electrical control signals are provided from the controlling device such as an electronic data processing system, for example, to feed card A (from hopper means 26), feed card B (from hopper means 28), eject card left, and eject card right. In addition, a control signal is produced at the station by sensing means 43. Sensing means 43 comprises a solar cell and a light source mounted on opposite sides of the card path.

It will be recognized by those skilled in the art that a very flexible control is possible with the apparatus of the present invention. In the embodiment of the circuit shown in the drawings, the signal FD CD A is combined in AND circuit 58 with the signal not FD CD B and a timing signal which signifies that cam 56 is at the high dwell position. The output of AND circuit 58 is coupled through driver 60 to energize magnet 35 to feed a card from hopper means 26 through feedrolls 30, 32 to the holding station. Likewise, AND circuit 62 and driver 64 are provided to energize magnet 37 when the signals not FD CD A, FD CD B, and the timing signal are coincidentally present.

The control of the card ejecting means 18 is accomplished by sensing the signal generated by sensing means 43 which occurs when a card covers the solar cell. This signal is combined with a signal EJECT CD R and the signal not EJECT CD L in AND circuit 66 to energize magnet 41 and eject the card to the right. In a similar manner, the signal is combined in AND circuit 68 with the signals not EJECT CD R and EJECT CARD LEFT to energize magnet 39 and thereby eject the card to the left (FIGURE 1) from the station. Depending upon the delay in the circuits, it may be necessary to introduce additional delay to insure that the eject rolls are not energized until the card is fully into the cornering station.

Many other modes of operation may be used with this mechanism. For example, the card may be held in the holding and cornering station until a decision is made as to which direction to eject the card.

Although the card path from hopper means 26, 28 to the feedrolls 30, 34 is shown as being at right angles, it has been found that misalignment by several degrees of cards entering the feedrolls 30, 34 results in accurate alignment in the holding station so that this feature may be used to corner cards at some angle other than a right angle.

While the invention has been particularly shown and described with reference to a preferred embodiment thereof, it will be understood by those skilled in the art that various changes in the form and details may be made therein without departing from the spirit and scope of the invention.

What is claimed is:

1. A mechanism for handling record cards comprising a pair of sets of two counter rotating feedrolls, said sets of feedrolls being spaced one record card width apart to form a holding and cornering station therebetween;
   means for feeding a record card into said station through either of said sets of feedrolls; and
   means for moving the record card at an angle to the direction fo feeding cards into said station to eject the card from said card processing station.

2. A record card handling mechanism including first and second sets of two feedrolls, said sets of feedrolls being spaced apart approximately the width of a record card;
   means for driving said feedrolls to feed a record card to a position between said sets of feedrolls;
   means for feeding a record card to said position between said sets of feedrolls through either of said sets of feedrolls; and
   means for ejecting the record card from said position between said sets of feedrolls at an angle to the direction for feeding cards into the feedroll sets.

3. A mechanism for handling record cards comprising a pair of sets of two counter rotating feedrolls said sets of feedrolls being spaced one record card width apart to form a holding and cornering station therebetween;
   means for feeding a record card into said station through either of said sets of feedrolls; and
   means for moving the record card substantially at right angles to the feedrolls to eject the card from said card processing station.

4. A record card handling mechanism including first and second sets of two feedrolls said sets of feedrolls being spaced apart approximately the width of a record card;
   means for driving said feedrolls to feed a record card to a position between said sets of feedrolls;
   means for feeding a record card to said position between said sets of feedrolls through either of said sets of feedrolls; and
   means for ejecting the record card from said position between said sets of feedrolls at substantially a right angle to the direction for feeding into the feedroll sets.

5. A mechanism for handling record cards comprising a pair of sets of counter rotating feedrolls spaced one record card width apart to form a holding and cornering station therebetween;
   means for feeding a record card into said station through either of said sets of feedrolls;
   means for sensing the entry of a record card into said station; and
   means responsive to said entry sensing means for moving the record card substantially at right angles to the feedrolls to eject the card from said card processing station.

6. A record card handling mechanism including first and second sets of feedrolls spaced apart approximately the width of a record card;
   means for driving said feedrolls to feed a record card to a position between said sets of feedrolls;

means for feeding a record card to said position between said sets of feedrolls through either of said sets of feedrolls;

means for sensing the entry of a record card into said station; and means energized in response to said entry sensing means for ejecting the record card from said position between said sets of feedrolls at substantially a right angle to the direction for feeding into the feedroll sets.

7. A mechanism for handling record cards comprising a pair of sets of two counter rotating feedrolls, said sets of feedrolls being spaced one record card width apart to form a holding and cornering station therebetween;

first means for feeding a record card into said station through the first of said sets of feedrolls;

second means for feeding a record card into said station through the second of said sets of feedrolls;

means for selectively energizing one of said means for feeding to move a record card into said station; and means for moving the record card substantially at right angles to the feedrolls to eject the card from said card processing station.

8. A record card handling mechanism including first and second sets of two feedrolls, said sets of feedrolls being spaced apart approximately the width of a record card;

means for driving said feedrolls to feed a record card to a position between said sets of feedrolls;

a first means for feeding a record card to said position between said sets of feedrolls through said first set of feedrolls;

second means for feeding a record card to said position between said sets of feedrolls through said second set of feedrolls;

means for selectively energizing one of said means for feeding to move a record card to the position between said sets of feedrolls; and means for ejecting the record card from said position between said set of feedrolls at substantially a right angle to the direction for feeding into the feedroll sets.

9. A mechanism for handling record cards comprising first and second sets of two counter rotating feedrolls, said sets of feedrolls being spaced one record card width apart to form a holding and cornering station therebetween;

means for feeding a record card into said station through said first of said sets of feedrolls in a first direction;

means for feeding a record card into said station through said second sets of feedrolls in a second direction; and means for moving the record card substantially at right angles to the feedrolls to eject the card from said card processing station selectively in either a third or a fourth direction.

10. A record card handling mechanism including first and second sets of two feedrolls, said sets of feedrolls being spaced apart approximately the width of a record card;

means for driving said feedrolls to feed a record card to a position between said sets of feedrolls;

means for feeding a record card to said position between said sets of feedrolls through said first of said sets of feedrolls in a first direction;

means for feeding a record card to said position between said sets of feedrolls through said second of said sets of feedrolls in a second direction; and means for selectively ejecting the record card in either a third or a fourth direction from said position between said sets of feedrolls at substantially a right angle to the direction for feeding into the feedroll sets.

11. A mechanism for handling record cards comprising a first and a second set of two counter rotating feedrolls, said sets of feedrolls being spaced one record card width apart to form a holding and cornering station therebetween;

selectively actuatable picker knife means for feeding a record card into said station through one of said sets of feedrolls; and selectively actuatable eject roll means for moving the record card substantially at right angles to the feedrolls to eject the card from said card processing station.

References Cited

UNITED STATES PATENTS

| | | | |
|---|---|---|---|
| 1,959,854 | 5/1934 | Cameron | 271—44 |
| 2,995,242 | 8/1961 | Branscomb | 209—110 |

M. HENSON WOOD, Jr., *Primary Examiner.*

R. A. SCHACHER, *Assistant Examiner.*